United States Patent Office 2,818,228
Patented Dec. 31, 1957

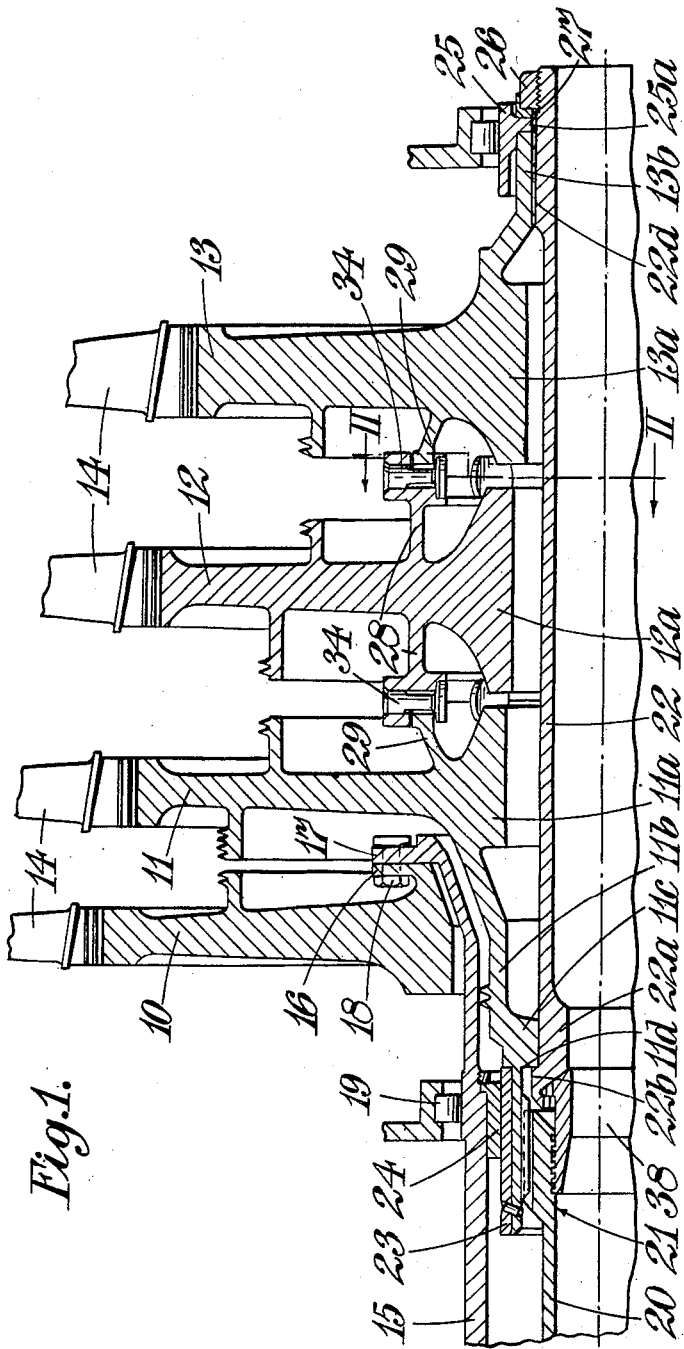

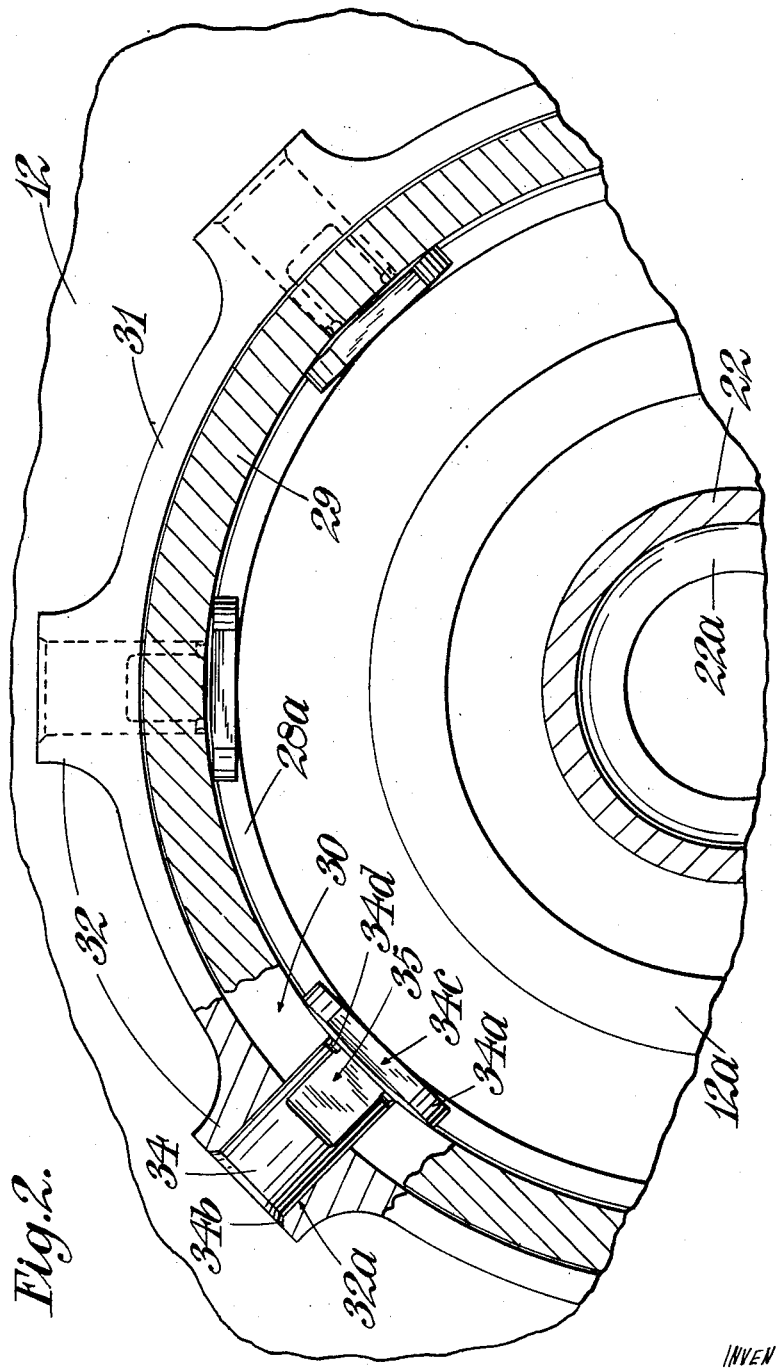

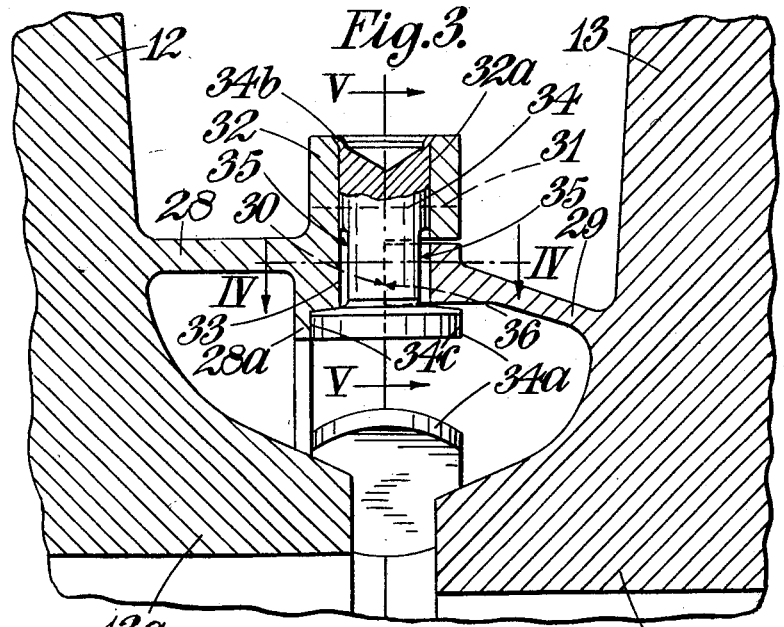
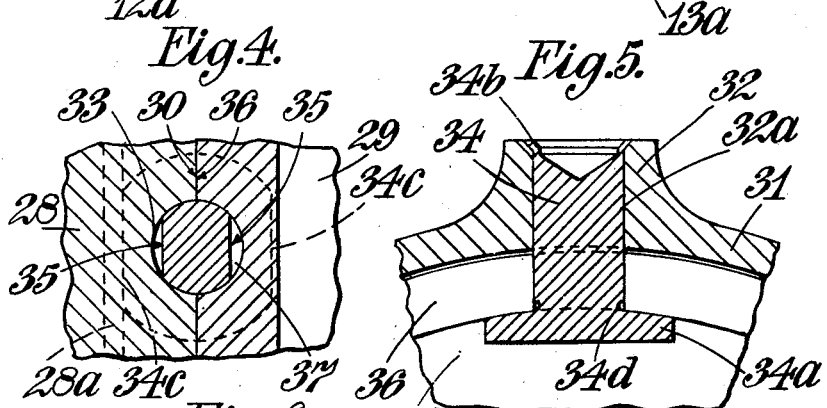
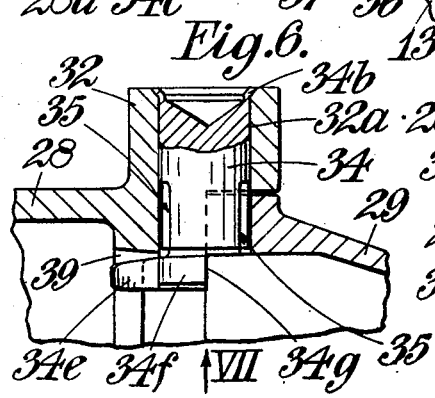
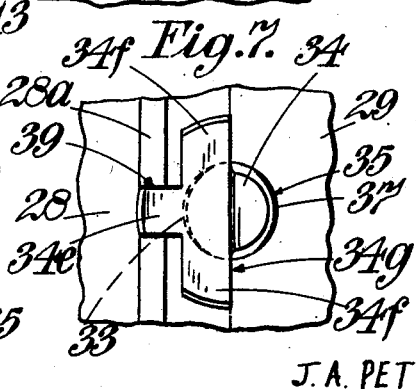

2,818,228

ROTOR FOR GAS-TURBINE ENGINE WITH MEANS TO LOCATE ROTOR DISCS WITH RESPECT TO ONE ANOTHER

James Alexander Petrie, Littleover, England, assignor to Rolls-Royce Limited, Derby, England, a British company Application April 18, 1955, Serial No. 502,081

Claims priority, application Great Britain April 30, 1954

6 Claims. (Cl. 253—39)

This invention relates to rotors for gas-turbine engines and is concerned more specifically with rotors of the kind comprising a plurality of discs.

In such rotors, it is well-known to provide means to locate the discs radially with respect to one another, to locate them circumferentially and to connect them torsionally together and it is also well-known for the discs to be located axially by axial abutment one against the other.

According to the present invention, in a rotor of the kind comprising a plurality of coaxially-arranged discs the means to locate the discs circumferentially and to locate the discs radially with respect to one another is provided solely by a plurality of pins of which the shanks are adapted to engage with radially-extending oppositely and circumferentially-facing surfaces on one of said discs, and with corresponding surfaces on the other of said discs.

According to a preferred feature of the invention said surfaces are formed by semi-cyclindrical recesses in adjacent discs, the axes of the recesses being radial, and the shanks of the pins are of circular section, and are relieved over the axially-facing portion of their surfaces where the pins engage in the semi-cylindrical recesses.

Each of the pins is preferably carried by one of said discs by having a portion of its shank engaging in a full-circular-section hole in a part of said disc, the hole being co-axial with and a continuation of the semi-cylindrical recess in said disc.

On assembly of a rotor in accordance with these preferred features of the invention, the recesses in adjacent discs register with one another to afford full-circular-section holes, and preferably the diameter of the pins is such as to have an interference fit with the holes. The recesses are preferably formed by drilling the discs in the assembled position.

Preferably moreover the discs are provided at a substantial radius from their axes with axially-directed flanges which abut one another over plane axially-facing surfaces to determine the axial spacing of the discs and to ensure that the discs are square with respect to one another, i. e., that their axes of symmetry are correctly aligned. In such an arrangement the pins are conveniently mounted in one flange with their axes contained in the plane of the abutment surface of the flange, and the other flange has the semi-cylindrical recesses correspondingly spaced around its abutment surface with their centre-lines in the plane of the surface.

It has been found that where there are provided two separate means, one to ensure the circumferential location of the discs such as interengaging teeth, and the other to ensure the radial location of the discs, such as a spigot on one disc engaging in a bore in the other disc, the concentricity and therefore the balance of the assembly may be disturbed on application of a torque load, owing to the impossibility of ensuring absolute accuracy on both locations.

However, where the circumferential location and the radial location are provided by a single means as in the constructions according to the present invention, the concentricity and therefore the balance cannot be disturbed by application of a torque load.

The present invention has an important application in rotor constructions in which a bolt member extends shaft-wise through some at least of the discs to engage a nut member to place the assembly in compression. For instance the bolt may extend freely through the disc assembly from one side to the other, and abut the assembly at one end, the nut abutting the assembly at the other end, or the nut member may be carried by one end disc between it and the next disc and the bolt member may extend through the next disc to engage the nut.

One construction of rotor as just set forth and embodying the invention will now be described with reference to the accompanying drawings in which—

Figure 1 is a part longitudinal section through the rotors of a multi-stage axial-flow turbine of a gas-turbine engine, Figure 2 is a section on the line II—II of Figure 1, Figure 3 is a part of Figure 1 to a larger scale, Figure 4 is a section on the line IV—IV of Figure 3, Figure 5 is a section on the line V—V of Figure 3, Figure 6 is a view corresponding to part of Figure 3, showing a modification, and Figure 7 is a view in the direction of arrow 7 in Figure 6.

Referring first to Figure 1, the turbine rotor illustrated comprises four discs 10, 11, 12, 13, of which the high-pressure disc 10 rotates independently of the three downstream discs 11, 12 and 13 which are connected to rotate together. The discs carry turbine blading 14 at their peripheries.

The high-pressure disc 10 is carried at an end of a hollow shaft 15 and is secured on the shaft by being provided with a flange 16 to abut against a flange 17 on the end of the shaft and by providing bolts 18 to hold the flanges 16 and 17 in axial abutment. The shaft 15 is mounted in bearings, one of which is shown at 19.

The low-pressure rotor assembly is arranged to drive a shaft 20, and comprises the discs 11, 12 and 13 which are mounted on a member 22. The latter not only forms an axial extension of the shaft 20, which is driven from the disc 11 through a combined helical spline and spherical coupling 21, but also is the means by which the discs 11, 12 and 13 are held in axial abutment with one another. The low-pressure rotor assembly including the member 22 is supported in bearings on the upstream side of the disc 11 and on the downstream side of the disc 13 in a manner to be described below.

Each of the discs 11, 12 and 13 is provided with an axially-thickened hub, 11a, 12a, 13a respectively, which is bored centrally to permit the free passage therethrough of the member 22. The hub 11a is provided with an upstream-extending flange 11b having an internal land 11c with an internal cylindrical surface to engage on a radially-inwardly-thickened portion 22a of the member 22, and also having an axially-facing surface 11d to abut the enlarged head 22b of the member 22. The upstream end of flange 11b carries externally a plain bearing member 23 and is internally splined to co-operate with external splines on shaft 20, these forming part of coupling 21. A spherical-surfaced member 38 has screw-thread engagement within the end of the shaft 20, and abuts a corresponding axially-facing spherical surface on the head 22b of member 22, with which it is engaged by means of a bayonet-type toothed engagement. The bearing member 23 rotates with respect to a co-operating plain bearing member 24 secured within the shaft 15. The angle of the helical splines of the coupling 21 is so chosen that the resultant forces acting on the shaft 20 on the one hand, and on the turbine assembly including discs 11, 12, 13 and member 22 on the other hand, place a compressive load on the abutting part-spherical surfaces on the head 22b and the member 38 thus tending to hold them in contact. The member 38 will be locked against rotation with respect to the member 22 in any convenient manner for example by internal splines on the members 22, 38 engaging with external splines on a sleeve within their bores.

The disc 13 has a downstream-extending flange 13b formed with internal splines to engage corresponding external splines on a land 22d, and the end of the flange 13b abuts against an inwardly-directed flange 25a on the inner race 25 of the bearing at the downstream end of the low-pressure rotor assembly. The flange 25a is held in abutment with the flange 13b by means of a nut 26 threaded on the end of the member 22, and a locking washer 27 is provided between the nut and the flange 25a. The bore of the flange 25a and the locking washer 27 are also provided with features to engage the external splines on the land 22d.

The discs 11, 12, and 13 are also provided at a radius substantially outside their hubs with axial flanges which on assembly come into abutment and determine the axial spacing and the squareness of the discs as will be described in more detail below, and it will be seen that on tightening the nut 26 on the member 22 the assembly comprising the discs 11, 12 and 13, is placed in compression and the member 22 is placed in tension.

The flanges which determine the axial spacing of the discs also carry means for determining the radial location of the discs and for simultaneously locating them circumferentially with respect to one another. It will be seen that the disc 12 has oppositely-directed similar flanges 28 and that the discs 11 and 13 each have one flange 29, these flanges being similar and directed towards the flanges 28.

Referring now to Figures 2 to 5, each of the flanges 28 is radially thickened at its edge and is formed with a rebate to provide an axially-facing plane surface 30 which is overhung by an axial, flange-like projection 31 formed externally with a number of circumferentially-spaced bosses 32.

The bosses are formed with holes 32a of circular section whereof the axes are radial and lie in the plane of the surface 30 and the holes are extended through the thickened edge of the axial flange 28 so as to extend to the radially-inner limit of the surface 30. There is thus formed in the surface 30 a plurality of circumferentially-spaced semi-circular notches 33.

The holes 32a in the bosses 32 and the semi-circular notches 33 are occupied by pins 34 having at their inner ends heads 34a to locate them radially in one direction and having peened-over parts 34b at their outer ends to prevent disengagement of the pins 34 from the holes. The surfaces of the heads 34a adjacent the pin shanks are made part-spherical, and the parts of flange 28 around the semi-circular notches 33 are made part-spherical to co-operate with these heads.

The pins 34 are located against rotation in the holes 32a by having flats 34c formed on their heads, one of which engages with an inwardly-directed flange 28a on the inner periphery of the thickened edge of flange 28.

The portions of the shanks of the pins 34 which lie within the semi-circular notches 33 are symmetrically relieved on their axially-facing portions as indicated at 35, so that the surfaces of these portions of the pin shanks are in contact with the notches 33 only over their circumferentially-facing parts. It is arranged that these parts of the pin shanks are an interference fit in the notches. Also, since the axes of the pins 34 lie in the plane of the surface 30, the exposed parts of the pin shanks stand proud from the surface 30 and have relieved portions 35 facing the flange 29. The pins 34 also have a stress-relieving groove 34d around the shank immediately adjacent the head.

The edge of the flange 29 is also radially thickened and is of such thickness as to enter the rebate in the thickened edge of the flange 28 with a small radial clearance between the radially-facing surfaces of the parts but with its axially-facing surface 36, which is plane, in abutment with the surface 30. The abutment of the surfaces 30, 36 determines the axial spacing of the discs. The thickened edge of the flange 29 is formed with a series of semi-circular notches 37 having a spacing and diameter corresponding to the spacing and diameter of the pins 34, so that when the discs are brought axially together and the surface 36 is brought into abutment with the surface 30, the notches 37 engage the pins 34 over the circumferentially-facing portions of their surfaces, thus to locate the discs circumferentially with respect to one another and also to provide a torsional connection between the discs. This engagement also affords an interference fit. As will be well appreciated the radial pins also locate the discs radially with respect to one another.

Preferably the notches 33, 37 are drilled with the flanges in the assembled position, so that they register with the greatest possible accuracy.

In a modification shown in Figures 6 and 7, the pins 34 have T-shaped heads, whereof the legs 34e enter notches 39 in the flange 28a to prevent rotation of the pins, and whereof the lateral arms 34f have a common surface 34g directed towards the flange 29 and contained in the plane of the abutment surface 30, and a part-spherical surface adjacent the pin shanks. Thus the heads of the pins only seat on the inner surface of the thickened edge of flange 28, so that the inner surfaces of the flanges 28, 29 may have slightly different radii.

From the foregoing description it will be seen that the present invention provides a simple and readily produced means for locating discs circumferentially with respect to one another and also for maintaining the discs concentric with respect to one another. The invention also provides a simple means of locating discs axially with respect to one another as compared with couplings in which abutting flanges are formed with interengaging teeth.

Although described in relation to an assembly of three discs, it will be appreciated that the invention can be applied to an assembly of two discs, or of a larger number.

I claim:

1. A rotor comprising a plurality of coaxially-arranged rotor discs, each of an adjacent pair of said discs having an axially-extending circumferential flange directed towards the other disc of the pair, the flanges having plane, axially-facing faces which abut one another directly to locate the pair of discs axially with respect to one another, and each of said flanges being formed with a plurality of circumferentially-spaced radially-extending semi-cylindrical recesses, each of which recesses opens to the abutting face of the flange in which it is formed and extends with its axis radial from the radially-inner limit to the radially-outer limit of said face, the recesses in one of the abutting flanges being in register with the recesses in the other of the flanges thereby to form radially-extending holes, one of said flanges having in it a plurality of full circular-section holes, each hole being co-axial with and being formed as a radial continuation of one of the semi-cylindrical recesses, and further comprising a plurality of pins each having a shank, the shanks having correspondingly-cylindrical surface portions engaging the recesses, and cooperating means on the pins and flanges to prevent radial disengagement thereof thereby to provide the sole means to locate the said adjacent discs circumferentially and radially with respect to one another, and the shanks having also a portion extending with the full circular-section holes in said one of the flanges.

2. A rotor as claimed in claim 1 wherein the corresponding cylindrical surface portions of the shanks are circumferentially facing and are interconnected by relieved axially-facing surface portions which are out of contact with the surfaces of the recesses.

3. A rotor as claimed in claim 1, wherein said portions of the pin shanks extending within the holes have an interference fit with the holes.

4. A rotor as claimed in claim 1, wherein said cooperating means includes a head at the radially inner end of each pin shank, each head having a part-spherical surface adjacent its shank, and said one of the flanges has correspondingly part-spherical inwardly-facing surfaces at the radially inner ends of recesses engaged by the part-spherical surface of the heads.

5. A rotor as claimed in claim 1, wherein said cooperating means includes heads on the pins at the radially inner ends of their shanks, the heads having each a part-spherical surface adjacent the shank, said one of the flanges has at the radially inner ends of the recesses part-spherical surfaces co-operating with the part-spherical surfaces of the heads, and the heads have lateral arms engaging notches in said flange to locate the pins angularly in their recesses.

6. A rotor comprising a plurality of coaxially-arranged rotor discs, each of an adjacent pair of said discs having an axially-extending circumferential flange directed towards the other disc of the pair, the flanges having plane, axially-facing faces which abut one another directly to locate the pair of discs axially with respect to one another, and each of said flanges being formed with a plurality of circumferentially-spaced radially-extending semi-cylindrical recesses, each of which recesses opens to the abutting face of the flange in which it is formed and extends with its axis radial from the radially-inner limit to the radially-outer limit of said face, the recesses in one of the abutting flanges being in register with the recesses in the other of the flanges thereby to form radially-extending holes, and further comprising a plurality of pins each having a shank, the shanks having correspondingly-cylindrical surface portions engaging the recesses, and cooperating means on the pins and flanges to prevent radial disengagement thereof thereby to provide the sole means to locate the said adjacent discs circumferentially and radially with respect to one another, said correspondingly-cylindrical surface portions of the shanks being circumferentially-facing and being interconnected by relieved axially-facing surface portions which are out of contact with the surfaces of the recesses.

References Cited in the file of this patent

UNITED STATES PATENTS

| | | |
|---|---|---|
| 2,492,833 | Baumann | Dec. 27, 1949 |
| 2,660,399 | Robinson et al. | Nov. 24, 1953 |
| 2,702,687 | Ledwith | Feb. 22, 1955 |